United States Patent [19]

King

[11] 4,031,510

[45] June 21, 1977

[54] SPEED DETECTION SYSTEM FOR AUTOMOBILES AND OTHER MOTOR-DRIVEN OBJECTS

[76] Inventor: Frederick N. King, 5068 Franklin Ave., Los Angeles, Calif. 90027

[22] Filed: Dec. 19, 1975

[21] Appl. No.: 642,332

[52] U.S. Cl. .............................. 340/62; 340/38 R;
340/263; 180/105 E

[51] Int. Cl.² .......................................... B60Q 1/54

[58] Field of Search ............ 340/53, 62, 263, 38 R;
324/160, 175, 176, 178; 246/28 R, 63 R, 182
R, 182 A, 182 C; 180/98, 105 R, 105 E, 106;
235/92 TC, 95 A

[56] References Cited

UNITED STATES PATENTS

| 2,877,454 | 3/1959 | Zedlar et al. | 340/38 R X |
|---|---|---|---|
| 2,927,836 | 3/1960 | Shore | 340/263 |

*Primary Examiner*—Alvin H. Waring
*Attorney, Agent, or Firm*—Roger A. Marrs

[57] ABSTRACT

A system for accurately detecting and registering the speed of motor vehicles or other motor-driven objects moving between two closely spaced points of detection includes a calibrator for adjusting the system for varying spacings between points of detection within an adjustable range and for adjusting the system to compensate for errors in speed caused by the variation in reaction times of the various detector units used to start and stop the timing in speed calculation. The system calibrator includes a set of adjustable controls with associated electronic and logic circuitry to adjust the system to the spacing or "effective spacing" between points of detection without altering the inverse-ratio relationship of speed vs. time over the speed detection range of the system.

With the calibrator set to compensate for errors, the accurate speed of automobiles and other motor-driven objects moving across the two points of detection is calculated from time of travel by means of a simple electronic calculator, and the speed of each vehicle is displayed in miles per hour or kilometers per hour on a light display until the next following vehicle crosses the sensors, whereupon the speed of that vehicle is shown. The speed is also output in digital form for use by remote equipment.

11 Claims, 4 Drawing Figures

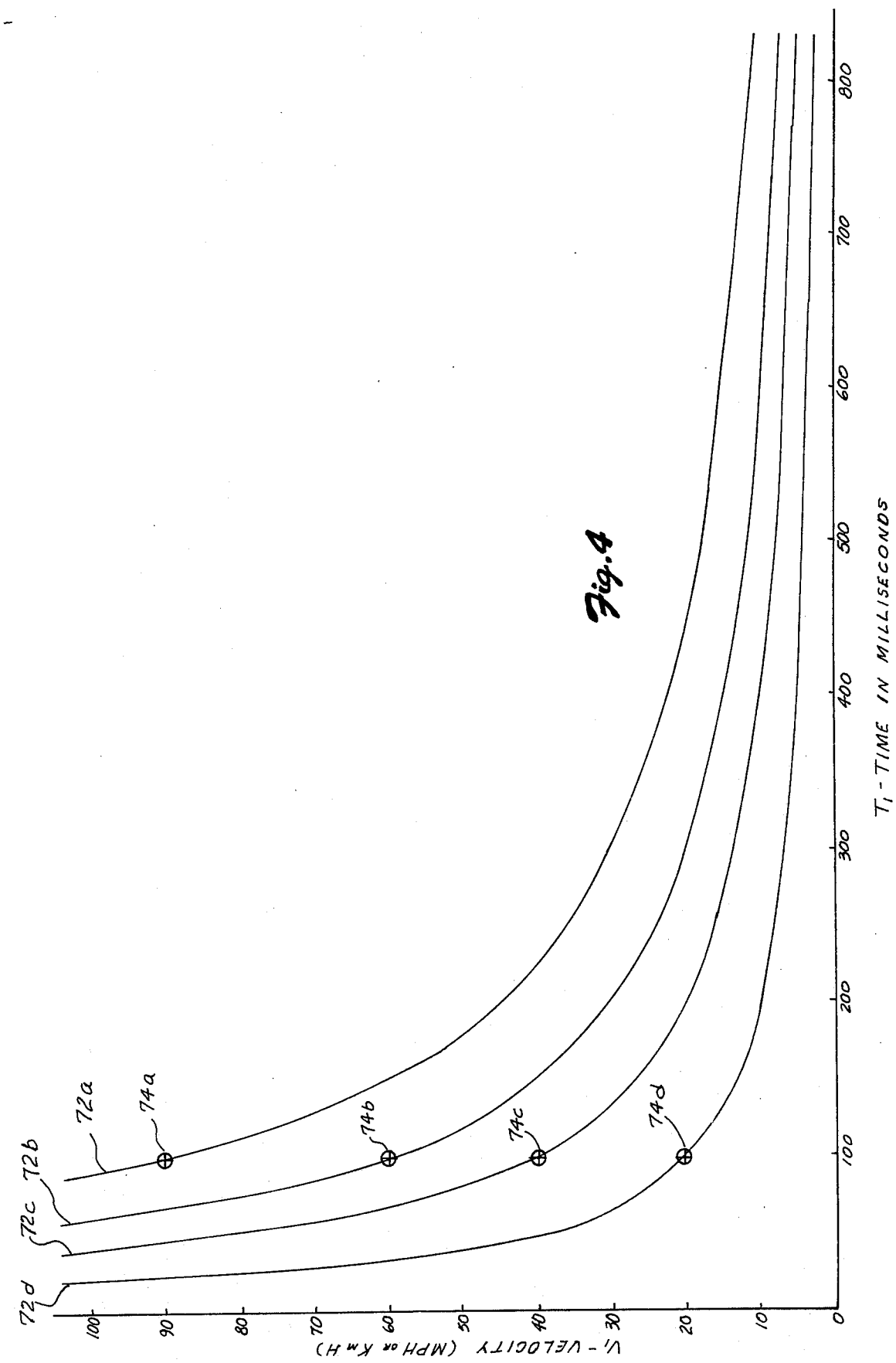

SPEED DETECTION SYSTEM FOR AUTOMOBILES AND OTHER MOTOR-DRIVEN OBJECTS

BACKGROUND OF THE INVENTION

1. Field of the Invention

This invention relates to devices for detecting the speed of motor vehicles and in the preferred embodiment relates to a system for detecting the speed of motor vehicles for use in traffic control, law enforcement and traffic flow studies.

2. Description of the Prior Art

Speed detection of motor vehicles in the past has been accomplished through the use of expensive radar type devices, the use of computers which calculate speed from time of travel between points of detection, or by the use of pace cars. In the case of radar type devices and computers for determining the speed of motor vehicles, cost is a major limiting factor in their use. In the case of pace cars, the method is unsuited for traffic control or for the continuous monitoring of the speed of motor vehicles. The accuracy is limited by the physical installation of vehicle sensing units and by the accuracy of registering and transmitting the start and stop times to the computer.

In the past, traffic responsive traffic control systems have depended on vehicle count per unit of time for the adjustment in system operation, or they have depended on vehicle presence detection to indicate when vehicles are waiting at a traffic signal. In some cases a combination of the two methods is used.

It is easily shown that count of cars per unit of time has little to do with the speed of traffic flow, i.e., vehicles traveling 40 MPH with a spacing of 108 feet would have the same vehicle count per minute as vehicles with a spacing of 54 feet traveling 20 MPH, or those traveling 60 MPH with a spacing of 176 feet. All would have two second headways (one vehicle each two seconds).

In traffic surveillance and roadway modeling, an attempt has been made to determine the density of traffic flow (lane occupancy) by using a computer to calculate the detector "ON" time (the time it takes a vehicle to pass over the detector) versus the detector "OFF" time (the time in which there is no vehicle over the detector). These calculations have been rough approximations at best, since the sizes of vehicles vary considerably from the largest trucks and trailers to the smallest automobiles and motorcycles. Also, the reaction time (speed of response turning on or off) varies from detector to detector, injecting additional unpredictable errors in the calculations.

Accurately determining the speed (rate of flow) along with the count per unit of time (average headway), and using these in traffic surveillance and traffic control, would have decided advantages over methods now in use. Also, speed detection could be used to apprehend violators of speed laws, provided the accuracy of speed detection were such that evidence would be admissible in the courts. Monitoring of remote speed detection stations from a central office would be possible, using the speed detection system of this invention combined with a system of transmitting the speeds to the central location.

SUMMARY OF THE INVENTION

This invention provides an adjustable speed detection system for accurately calculating the speeds of motor vehicles and other motor-driven objects traveling between two points of detection by providing a means of calibrating the system to compensate for varying spacings between detection points, and to compensate for inaccuracies injected by the variation in reaction times for different electronic sensing units used to indicate the beginning and end of the timing interval from which the speed is calculated. Speed calculation is accomplished within the electronic circuitry of the speed detection device of this invention, and the device can be packaged in a small housing so that several units may be stored in a field cabinet at the site of the detection station. Lighted, decimal numbers, displayed in a matrix on the housing, will indicate the speed of the last vehicle crossing the detection points, and the speed will remain on display until another vehicle activates the start timing sensor for a new timing interval, whereupon the light display will be reset to zero and then display the speed of the second vehicle after it has crossed the stop timing point. The speed shown on the lighted indicator will also appear in digital form in an output register for delivery to external processing equipment, or for transmission to a central location. The time interval between speed readouts is the headway, or time spacing between vehicles, and the count of updates per unit of time is the vehicle count for the same period of time.

Simplicity of circuitry of this invention lends it to being constructed on printed circuit boards at a cost that should be in line with the cost of other traffic control devices now in general use.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 4 is a family of graphs showing the relationship between velocity and time across varying fixed distances and showing how adjusting the calibrator shifts from curve to curve without altering the speed-time relationship.

DESCRIPTION OF THE PREFERRED EMBODIMENT

Figure 2:
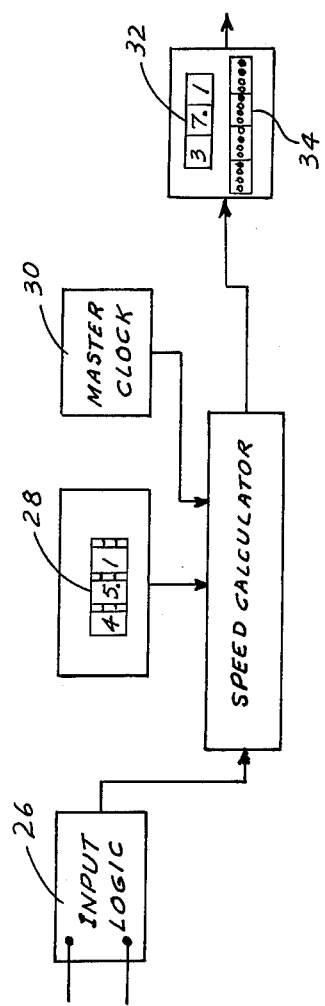
FIG. 2 is a schematic electrical block diagram of the speed detection system.

The present invention discloses an adjustable speed detection system for accurately detecting the speed of motor vehicles and other motor-driven objects moving across two points of detection along the path of travel. The invention incorporates a method of calibrating the system to compensate for varying spacings between the points of detection without altering the inverse ratio relationship of speed versus time over the distance between detectors. The method of calibration also provides a means of compensating for errors injected by differing magnetic and electrical characteristics of sensors, and varying reaction times of electronic devices that register the start and stop of the timing interval for speed calculation.

Three facts that should be considered paramount in speed detection systems for vehicles moving along a roadway are:

1. Over a fixed distance speed is inversely proportional to time, i.e., Velocity = (Distance/Time).
2. The start timing and stop timing points must necessarily be reasonably close together so that only one vehicle will be crossing the distance between the points of detection during any one timing interval.
3. For vehicles traveling at high speed over a short distance, small errors in time produce large errors in calculated speed (60MPH = 88 feet second).

Analyzing speed calculation for varying time of travel across a fixed distance, Velocity (V) = (Distance (D)/Time) (T). Since the distance (D) is constant we can replace it with the constant one (1) to represent one unit of distance. The equation then becomes $V = (1/T)$, and T is the time required to travel the unit of distance when traveling with a velocity of V.

In mathematics, the equation $y = f(x)$, and $f(x) = (1/xp)$, is the equation for an "infinite series". In the case where $p = 1$ ($y = (1/x)$), it is known as a "harmonic series" that is divergent (does not converge to a limit when increasing positive values are substituted for x).

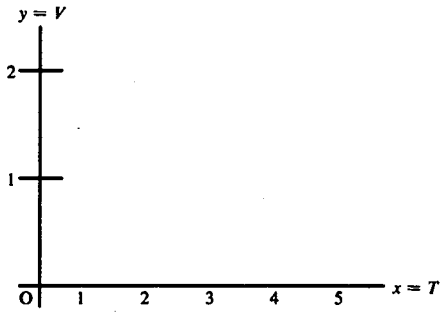

Drawing the graph of the equation $y = f(x)$:
$$f(x) = \frac{1}{x}, y = \frac{1}{x} \text{ or } V = \frac{1}{T}$$

$x = 1, y = 1.000$
$x = 2, y = 0.500$
$x = 3, y = 0.333^+$
$x = 4, y = 0.250$
... etc. to $y = 0$ when $x = $ infinity.

For two different speeds $V_1$ and $V_2$ requiring times $T_1$ and $T_2$ to travel the unit of distance; $V_1 : V_2 = (1/T_1 : 1/T_2$, or $(V_1/V_2) = (1/T_1 1/T_2)$ and $V_2 = (V_1 T_1/T_2)$. If we select $D = $ one unit of distance so that at speed $V_1$ MPH (or KmH), time $T_1$ to travel that distance is equal to 100 mS (milliseconds), or one unit of time, then at any time $T_2$ mS required to travel that distance, $V_2$ is equal to ($V_1$ MPH × 100 mS/$T_2$ mS), or $V_2 = V_1/T_2 \times 10^{-2}$ MPH. From this, if we have a way to adjust $V_1$ to the speed required to travel a unit of distance (any distance within the adjustable range of the calibrator) in the unit of time (100mS), we need only to divide $V_1$ (the setting on the calibrator) by $T_2 \times 10^{-2}$, or the time in hundredths of milliseconds, and we come up with the new velocity $V_2$ in MPH, or KmH if we are using the metric system. This is the principle on which the CALIBRATED SPEED DETECTION SYSTEM was developed.

Place the two vehicle sensors (start timing and stop timing) so that they are separated by any distance within the adjustment range of the calibrator; calculate the speed needed to travel the distance in 100 mS, and set this speed in the calibrator. To calculate any speed thereafter, we divide the speed set in the calibrator by the time interval of travel in hundredths of milliseconds.

Note: Whereas the unit of time was chosen as 100 mS, since it makes a convenient multiple in the decimal system and a convenient multiple of oscillator frequencies for time division, other constants of time could be used as well with different timing frequencies and different sensor spacings.

An example of calibration:

Effective detector spacing equals 6.61 feet; 6.61 feet in 100 mS equals 66.1 feet per second. 60 MPH = 88 ft./sec., then 66.1 ft./sec. = 66.1/88 × 60 MPH = 45.1 MPH.

Figure 3:
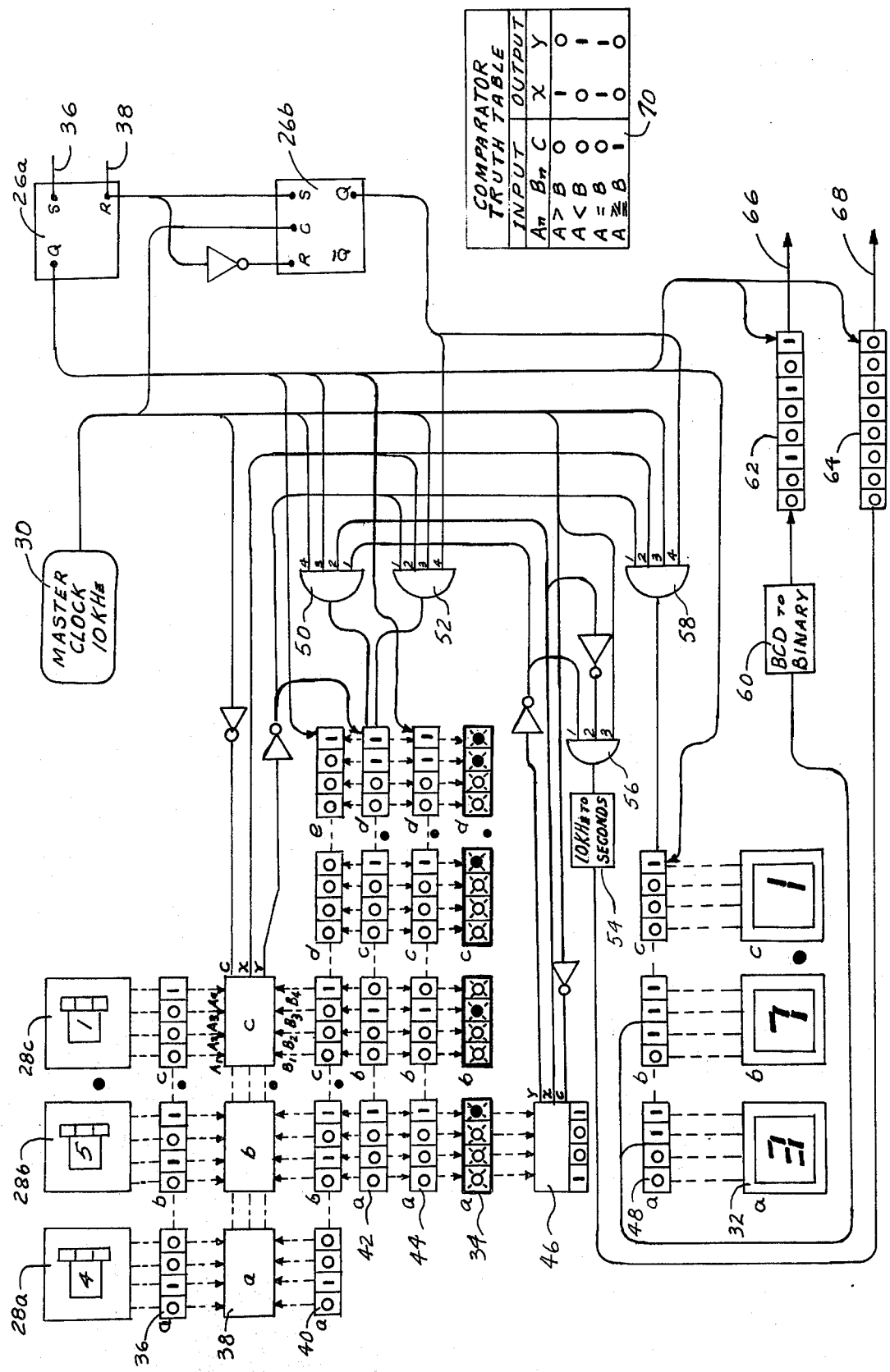
FIG. 3 is a simplified, graphic, circuit diagram of the speed detection system with typical values shown in the calibrator, the output display, and in the registers for a spacing of sensors corrected to compensate for errors.

In the speed detection system of FIG. 3, 45.1 MPH is set in calibrator 28 and the actual speed of travel for all vehicles is calculated from the time of travel and displayed in miles per hour on the output light display 32 and in digital output register 62.

The simplified schematic diagram (FIG. 3) shows the basic electronic circuit of the calibrator and speed calculator for a speed detection system for automobiles and other motor-driven objects moving between two points of detection along a roadway.

Referring to FIG. 3, BCD (binary coded decimal) thumb-wheel switches 28a, b, c have rotary contacts capable of setting any binary coded decimal number (0 to 9) in each of the three, 4-bit registers of a 12-bit register 36 a,b,c. The decimal number displayed in the window of each rotary switch represents the contents of its related 4-bit register. The total number (45.1 MPH shown in FIG. 3) represents $V_1$ in the equation $V_2 = V_1/T_2 = 10^{-2}$. The value to be set in the windows of BCD switches 28 a,b,c (the calibrator) can be approximated by measuring the physical separation of the detection points and calculating the speed necessary to travel that distance in 100 mS, i.e., detectors measured to be 8.80 feet from point of detection to point of detection would require a speed of 60.0 MPH to travel the distance in 100 mS, so 60.0 would be set in the windows of the switches. The speed from measured distance, however, would not be corrected to the actual points of detection. It includes errors injected by the electrical and magnetic characteristics of the sensing elements (amount of steel in the pavement and length of cable from sensing element to electronic sensors) and errors due to variation in reaction time of the electronic sensors.

The calibrated value to be set in the window display of switches 28 a, b, c can be arrived at by driving a pace car, having an accurately calibrated speedometer, across the sensors at any convenient speed (preferably an even multiple or 10 MPH to facilitate simplified calculation), and by observing the exact time of travel (accurate to 1/10th mS) as it is displayed in binary code on the PASSAGE INTERVAL BCD LIGHT DISPLAY 34 a, b, c, d, the light display made up of four groups of four lights each. A light turned on represents a one (1) state in that binary position of 34 a,b,c,d and in register 44 a,b,c,d the time interval storage register. These lights remain on until a vehicle following the pace car crosses the first point of detection at the speed station. The time interval of the pace car is read from the PASSAGE TIME INTERVAL LIGHT DISPLAY 34 a,b,c,d and recorded. With the speed of the pace car known and the exact time of travel across the detection points known, the effective distance between the points of detection can be calculated. Using the effective distance between the points of detection, the exact speed required for a vehicle to cross the distance in 100 mS is calculated. This speed is set in the CALIBRATOR 28 a,b,c, and the speed detection system is calibrated for all speeds. The measured distance is only useful in specification for construction.

The 45.1 MPH set in CALIBRATOR 28 a,b,c, of FIG. 3 is the calculated speed necessary for a vehicle to cross an effective distance between detectors equal to 6.61 feet in 100 mS. The value shown in the PASSAGE TIME INTERVAL LIGHT DISPLAY 34 a,b,c,d (121.3 mS) is the time required for the last vehicle that crossed the sensors, and its speed (37.1 MPH) is shown in the Light Display, 32 a,b,c. The speed also appears in binary form at output register 62. Since accuracies of 0.1 miles per hour are not necessary for calculations, the 1/10th mile per position is dropped.

The master clock, flip-flops, logic elements and registers in the simplified, schematic diagram are included to provide a method of measuring the time interval and calculating the speed to be output to the Light Display 32 a,b,c and output register 62.

In analyzing the method of calculating vehicle speed, an oscillator with a frequency of 10 KHz was chosen, since it is the lowest frequency with a multiple that will produce an accuracy of 1/10th. millisecond in measuring the time interval. Also, it will provide an accuracy of 1/10th mS in starting and stopping the timing sequence. Other frequencies could be used for greater or lesser accuracy; however, an accuracy of 1/10th millisecond is adequate, since an error of 1/10th mS in timing produces insignificant errors in speed when calculated to the nearest 1/10th MPH. The 10 KHz frequency is also fast enough to strobe the contents of registers, from register to register, and complete speed calculations in less than 1/10th second.

In the step by step analysis of speed calculation using the simplified schematic diagram of FIG. 3, the equation $V_2 = (V_1/T_2 \times 10^{-2}$ is the basic equation, where:

$V_1$ = CALIBRATOR setting and the contents of register 36 a,b,c (45.1 MPH shown in the windows of BCD switches 28 a,b,c in FIG. 3)

$T_2$ = Time interval of travel across the sensors as shown on the LIGHT DISPLAY (BCD) PASSAGE TIME INTERVAL (121.3 mS shown in 34 a,b,c,d FIG. 3)

$V_2$ = Velocity of the last vehicle that passed across the sensors of the speed detection system (37.1 MPH shown in the Light Display 32 a,b,c, in FIG. 3)

Note: Register 42 a,b,c,d (the interval timing register) is offset two decimal places to the right to represent $T_2 \times 10^{-2}$ (42d under 40e).

Figure 1:
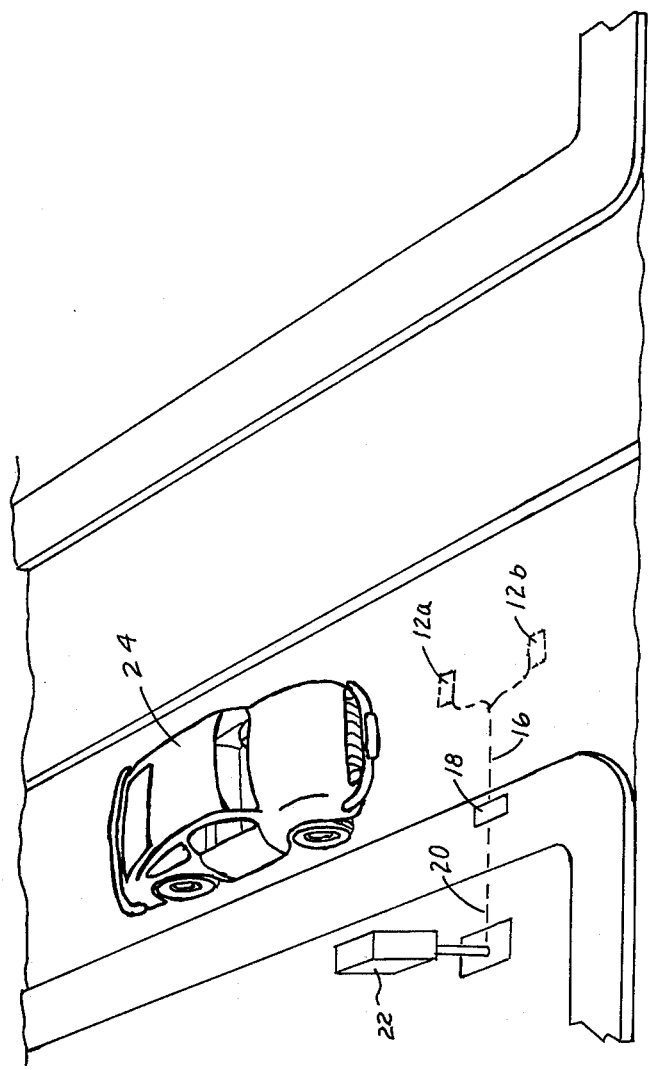
FIG. 1 is a perspective view showing a vehicle approaching the start timing and stop timing sensors buried beneath the surface of the roadway.

Division of $T_2$ (contents of register 42 a,b,c,d) into $V_1$ (contents of register 36 a,b,c) is accomplished by moving the contents of the register 42 a,b,c,d into register 40 a,b,c,d,e and repeatedly adding the container of register 42 a,b,c,d, to register 40 a,b,c,d,e until the contents of register 40 a,b,c is equal or slightly greater than the contents of register 36 a,b,c. The pulses of clock 30 strobe the contents of register 42 a,b,c,d into the register 40 a,b,c,d,e until the three left-hand decimal digits 40 a,b,c are equal or slightly greater than the three digits of register 36 a,b,c (comparator 38 a,b,c, stop the addition). The clock pulses, or iterations, required to add the contents of register 42 to the contents of register 40 until the contents of register 40 a,b,c equals or just exceeds the contents of register 36 are counted in register 48 a,b,c. The contents of 48 is displayed in decimal form in Light Display, 32 a,b,c and is the velocity in miles per hour or kilometers per hour of the vehicle that just passed over the points of detection 12a and 12b in FIG. 1, $V_2$ in the equation $V_2 = V_1/T_2 \times 10^{-2}$ The contents of register 48a,b,c also appears in binary form in register 62 and is available at output 66 for external processing.

In cases where vehicles are moving rather slowly, less than 5 to 10 MPH, or when they are stalled over the speed detectors, Comparator 46 stops the timing interval when the contents of register 42 reaches 900.0 mS, and transfers timing through the 10 KHz to 1 sec. converter 54 to register 64 where timing is stored in seconds and available at output 68.

The timing sequence and the beginning of a vehicle speed calculation sequence is initiated when FF-26a (RS Flip Flop) is turned on at 36 by a call from the start-timing sensor 12a FIG. 2. The interval timing is accomplished by counting the pulses of MASTER CLOCK 30 into register 42a,b,c,d through AND-gate 50, from the time the vehicle passes over the start-timing sensor until it passes over the stop-timing sensor 12b FIG. 1. FF-26a turns on with a pulse from the start timing detector and remains on until it receives a pulse from the stop timing detector. Output Q of FF-26a becomes energized when FF-26a turns "ON" and zeroes register 40a,b,c,d,e; register 44a,b,c,d; register 48a,b,c; register 62 and register 64. It also activates (changes from "0" to "1" state) input 4 of AND-gate 50. Input 1 and 2 of AND-gate 50 are held in the "ON" state by Comparator 46 (runaway check for stalled vehicles) unless the greatest significant digit (the 4-bit position furthest to the left) reaches the value of 9 which is pre-set in Comparator 46. Clock pulses reaching terminal 3 of AND-gate 50 (terminals 1, 2 and 4 being in the "ON" state) are counted, and the count is stored in register 42a,b,c,d. With four decimal positions (four, 4-bit positions) in registers 42a,b,c,d, time is recorded to the nearest 1/10th mS. When the vehicle reaches the stop-timing sensor 12b FIG. 2, reset R of FF-26a is energized, turning "OFF" AND-gate 50, stopping the timing interval and neutralizing the reset lines for registers 40, 44, 48, 62 and 64. The stop-timing detector energizes clock controlled FF-26b (RS Flip-Flop) on the next clock pulse and holds it energized as long as the vehicle is passing over stop-timing sensor 12b. Energizing FF-26b turns terminal 4 of AND-gate 52 to the "ON" state, and with terminals 1 and 2 "ON", each clock pulse strobes the contents of register 42a,b,c,d into register 40a,b,c,d,e. FF-26b also switches terminal 4 of AND-gate 58 to the "ON" state, and with terminals 1 and 2 in the "ON" state, the clock pulses that strobe the contents of register 42 into register 40 are counted in the register 48.

The counting of clock pulses that strobe the contents of register 42 into register 40 continues until comparators 38a,b,c switch AND-gates 52 and 58 to the "OFF" state, indicating that the contents of register 40a,b,c, is equal or greater than the contents of register 36a,b,c (see Comparator Truth Table 70). The contents of register 48a,b,c is displayed in Light display 32a,b,c and is the speed in miles per hour or kilometers per hour of the vehicle that passed over the sensors. The speed is converted into binary form by BCD to binary decoder 60 and stored in register 62 for output to external equipment at 66. The time interval between consecutive updates in register 62 is headway between vehicles, and the count of updates is the lane volume per unit of time.

FIG. 4 is a family of graphs showing the relationship of velocity and time with respect to effective detector spacing (physical separation of vehicle sensors corrected for errors in vehicle detector reaction time, magnetic characteristics of roadbed at sensors 12a and 12b and the variation of sensor reaction time with sensor to detector leadin cable for certain types of vehicle detectors; namely, inductive loop detectors).

72a shows the graph of speed versus time with an effective detector spacing of 13.2 feet the speed set in calibrator 28a,b,c would be 90.0 miles per hour; i.e., a vehicle traveling at 90.0 miles per hour would cross a distance of 13.2 feet in 100 mS and a speed of 90.0 miles per hour would be shown in Light Display 32a,b,c. For times other than 100 mS, the corresponding speed for that time would be displayed. The speed is calculated using the derived formula $V_2 = (V_1/T \times 10^{-2})$ where $V_2$ is the actual speed of the vehicle crossing the sensors, $V_1$ is the value set in calibrator 28a,b,c and $T \times 10^{-2}$ is the time of travel between sensors 12a and 12b in milliseconds shown in binary code on light display 34a,b,c,d.

Graph 72b is the graph for an effective detector spacing of 8.8 feet with the speed of 60.0 MPH set in calibrator 28a,b,c. 72c and 72d are graphs with an effective detector spacing of 5.87 feet and 2.93 feet respectively and with speeds of 40.0 MPH and 20 MPH respectively set in the calibrator. It is readily seen there is an almost infinite number of graphs that can be drawn showing the different detector spacings for speed calculations between 10 MPH and 99.9 MPH. Below 10 MPH the graph of speed versus time approaches the condition of being parallel with the time axis. With a vehicle stalled between vehicle sensors the speed would be zero and the length of time of travel would be infinite. This is why the speed detector was designed to switch to recording time after the time of travel between sensors reaches 900 mS or speeds below approximately 10 MPH for the more desirable detector spacings.

74a, 74b, 74c and 74d represent the speed on the respective graphs at which the calibrator 28a,b,c would be set to calibrate the system for the effective detector spacing necessary so that a vehicle will travel between the sensors in 100 mS at the speed.

At 20 MPH, or 29.3 feet per second, a vehicle travels 2.93 feet in 100 mS, and at 100 MPH, a vehicle travels 14.6 feet in 100 mS. Using 100 mS as a time constant and 10 KHz as the frequency of the timing oscillator, the speed detection system of this invention, calculating speed from time to travel between two points of detection, can be adjusted to operate on any detector spacing from 3 feet to just over 14 feet (FIG. 4). For best accuracy across a speed range of 10 MPH to 99 MPH, a separation of sensors near the upper limit of speed should be selected. Vehicle sensor spacing closer than 3 feet should only be used for speeds below 20 MPH. For detector spacings beyond 14 feet at speeds less than 100 MPH, a different frequency in the timing oscillator should be selected along with the proper time constant for the frequency selected.

With the use of a pace car, the speed detection system in this invention can be calibrated for accurate speed detection over a range of speeds from less than 10 MPH to 99 MPH. At speeds greater than 99 MPH, it is only necessary to alter the values of speed that can be set in the calibrator, the values that can be handled by the registers, and the values of speed to be output.

At slow speeds requiring more than 0.9 sec. to travel the distance between vehicle sensors, the time of travel in seconds is calculated rather than speed. To eliminate the error injected by varying lengths of motor vehicles, two discrete points of detection were chosen in the description of this invention, and the first instant of detection at each point is used in measuring the passage time between the points. This may be accomplished by having a separate electronic detector connected to each sensor, or by having one electronic detector connected to both sensing elements, provided it transfers sensing from the sensing element at the first point of detection to the sensing element at the second point of detection before the motor vehicle reaches the second point of detection. Also, in cases where average speed of motor vehicles is being sought, rather than the exact speed of each vehicle, one sensing element and one detector unit could be used instead of two. The calibrator would be set at a speed required for the average length vehicle to cross the sensing element in a unit length of time; however, the unit of time and frequency chosen would be different from those used in the description of this invention, since the maximum setting of the calibrator is 99.9 MPH, and in terms of speed, this represents approximately 14.5 feet in 100 mS. The average length vehicle is probably greater than 14.5 feet.

Although the description of this invention is based on its use in a vehicle speed detection system for traffic control, surveillance, etc., it is readily seen that the method of adjustment and calibration of the system for varying spacings between points of detection without altering the inverse ratio relationship of speed versus time can be applied in other fields for accurate speed detection. The text of this disclosure is not intent on limiting the scope of the invention to any particular field of endeavor.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An adjustable speed detection system for accurately recording the speed of moving objects between a pair of detection locations comprising:
    start timing sensor at the first detection location of said two locations responsive to an object for commencing a time interval;
    stop timing sensor at the second detection location of said two locations responsive to said object for terminating said time interval;
    speed calculation means coupled to said sensors and responsive to said time interval to determine speed of said object;

compensation means included in said speed calculation means to adjust said uncompensated calculated object speed for inaccuracies due to reaction time of said sensors; and a decimal display matrix coupled to said speed calculation means for visually indicating said object speed.

2. The invention as defined in claim 1 including a circuit in said display matrix for maintaining said visual display until the presence of another object is detected by said start timing sensor.

3. Apparatus according to claim 2 in which a high frequency oscillator is included in said speed calculation means to generate clock pulses as a means to accurately determine the time of travel of said object traveling from one location of detection to the other.

4. Apparatus according to claim 1 in which high speed electronic circuitry is operably coupled to said speed calculation means to start and stop the timing interval of said object crossing said two detection locations.

5. Apparatus in claim 1 in which said display means includes digital registers to count and store said clock pulses registering said time of travel of said object traveling from one location of detection to said other.

6. Apparatus according to claim 1 wherein said compensation means includes digital rotary switches as a calibrator to adjust the system for varying detector spacings and to compensate for errors inherent in the system without calibration.

7. Apparatus according to claim 1 in which said speed calculation means includes electronic gates operably connected to inverters, registers and comparators to cooperatively compute said speed of travel of said object between said two detection locations.

8. Apparatus according to claim 1 in which said decimal display includes digits showing the speed of the last object that crossed the two detection locations.

9. Apparatus according to claim 1 in which said speed of said object crossing two detection locations is stored in a digital register and output means therefor to external equipment for processing.

10. Apparatus according to claim 1 in which said time of travel over a preset number of milliseconds is stored in a digital register included in said speed calculation means for output to external equipment for processing.

11. Apparatus according to claim 1 in which thumbwheel digital switches are preset to compensate for varying spacing in points of detection and errors that are inherent in the system without calibration.

* * * * *